United States Patent
Libenzi et al.

(10) Patent No.: US 7,426,510 B1
(45) Date of Patent: Sep. 16, 2008

(54) BINARY DATA CATEGORIZATION ENGINE AND DATABASE

(75) Inventors: Davide Libenzi, Hillsboro, OR (US); Victor Kouznetsov, Portland, OR (US); Michael C. Pak, Portland, OR (US)

(73) Assignees: NTT DoCoMo, Inc., Tokyo (JP); McAfee, Inc., Santa Clara, CA (US)

( * ) Notice: Subject to any disclaimer, the term of this patent is extended or adjusted under 35 U.S.C. 154(b) by 412 days.

(21) Appl. No.: 11/010,538

(22) Filed: Dec. 13, 2004

(51) Int. Cl.
    *G06F 17/30* (2006.01)
(52) U.S. Cl. .................. 707/6; 707/3; 707/4; 707/7; 707/10
(58) Field of Classification Search ............ 707/7, 707/3, 4, 6, 10
    See application file for complete search history.

(56) References Cited

U.S. PATENT DOCUMENTS

| | | | | |
|---|---|---|---|---|
| 6,064,767 A * | 5/2000 | Muir et al. | | 382/190 |
| 6,161,130 A * | 12/2000 | Horvitz et al. | | 709/206 |
| 6,215,558 B1 * | 4/2001 | Kubota | | 358/1.15 |
| 6,571,248 B1 * | 5/2003 | Kusama | | 707/100 |
| 6,629,090 B2 * | 9/2003 | Tsuda et al. | | 706/47 |
| 6,785,818 B1 | 8/2004 | Sobel et al. | | 713/200 |
| 7,024,414 B2 * | 4/2006 | Sah et al. | | 707/101 |
| 2003/0012440 A1 * | 1/2003 | Nakanishi et al. | | 382/181 |
| 2003/0065926 A1 * | 4/2003 | Schultz et al. | | 713/188 |
| 2003/0225763 A1 * | 12/2003 | Guilak et al. | | 707/7 |
| 2004/0202138 A1 * | 10/2004 | Song et al. | | 370/335 |
| 2004/0240921 A1 * | 12/2004 | Koike et al. | | 400/76 |
| 2005/0060150 A1 * | 3/2005 | Li et al. | | 704/240 |
| 2005/0165848 A1 * | 7/2005 | Kusama et al. | | 707/104.1 |
| 2005/0273708 A1 * | 12/2005 | Motyka et al. | | 715/515 |
| 2006/0015325 A1 * | 1/2006 | Moore | | 704/9 |
| 2006/0123083 A1 * | 6/2006 | Goutte et al. | | 709/206 |

FOREIGN PATENT DOCUMENTS

| WO | WO00/36503 | 6/2000 |
|---|---|---|
| WO | WO02/071774 | 9/2002 |

\* cited by examiner

*Primary Examiner*—Don Wong
*Assistant Examiner*—Thanh-Ha Dang
(74) *Attorney, Agent, or Firm*—Zilka-Kotab, PC; Christopher J. Hamaty

(57) ABSTRACT

A system, method and computer program product are provided for categorizing data. In use, features are extracted from binary data. Such extracted features are compared with a predetermined set of features. Based, at least in part, on the comparison, the binary data is categorized.

26 Claims, 10 Drawing Sheets

500

502

ATGGCAAAACATGGCGCAGCATGGCGCAGCAAAAC

Fig. 5A 504
506

[ATGGC]AAAACATGGCGCAGC[ATGGC]GCAGCAAAAC
feature #1

508

A[TGGCA]AAACATGGCGCAGCATGGCGCAGCAAAAC
feature #2

AT[GGCAA]AACATGGCGCAGCATGGCGCAGCAAAAC
feature #3

Fig. 5B

| # | Feature | Count |
|---|---------|-------|
| 1 | ATGGC | 3 |
| 2 | TGGCA | 1 |
| 3 | GGCAA | 1 |
| 4 | GCAAA | 2 |
| 5 | CAAAA | 2 |
| 6 | AAAAC | 2 |
| 7 | AAACA | 1 |
| 8 | AACAT | 1 |
| 9 | ACATG | 1 |
| 10 | CATGG | 2 |
| 11 | TGGCG | 2 |
| 12 | GGCGC | 2 |
| 13 | GCGCA | 2 |
| 14 | CGCAG | 2 |
| 15 | GCAGC | 2 |
| 16 | CAGCA | 2 |
| 16 | AGCAT | 1 |
| 18 | GCATG | 1 |
| 19 | AGCAA | 1 |

BINARY DATA CATEGORIZATION ENGINE AND DATABASE

FIELD OF THE INVENTION

The present invention relates to computer processing/networking, and more particularly to categorizing computer data.

BACKGROUND

The rapid increase in the number of users of electronic data and the low cost of storing, processing, distributing, etc. electronic data, for example, via the Internet and other communications networks has resulted in computer users being inundated with data.

Just by way of example, electronic mass marketers (also called "spammers") use a variety of techniques for obtaining electronic messaging address lists. For example, marketers obtain electronic messaging addresses from postings on various Internet sites such as news group sites, chat room sites, or directory services sites, message board sites, mailing lists, and by identifying "mailto" address links provided on web pages. Using these and other similar methods, electronic mass marketers may effectively obtain large numbers of mailing addresses, which become targets for their advertisements and other unsolicited messages.

The aforementioned trend of data inundation is not unique to spam by any means. In many areas, there is a great need for improved ways to categorize data, thereby making such data more manageable, meet certain criteria, and/or serve a particular purpose. Just by way of example, improved data categorization techniques are desired in the realm of parental controls, hypertext mark-up language documents, and/or any other purpose requiring any sort of data categorization.

SUMMARY

A system, method and computer program product are provided for categorizing data. In use, features are extracted from binary data. Such extracted features are compared with a predetermined set of features. Based, at least in part, on the comparison, the binary data is categorized.

In one embodiment, the categorization may be utilized in the context of categorizing unwanted messages, parental controls, hypertext mark-up language documents, and/or any other purpose requiring any sort of categorization. Further, use of binary data may provide for categorization that is language-independent and/or format-independent, etc. For example, the use of binary data may allow categorization of documents without white space, etc.

In another embodiment, the predetermined set may be generated by analyzing exemplary data associated with at least one category. Further, the predetermined set may be generated by processing exemplary data associated with a corpus category and an anti-corpus category.

As an option, the processing may include extracting features from the exemplary data from both the corpus category and the anti-corpus category. Further, a first set of numbers of instances of the features existing in the exemplary data in the corpus category may be counted, as well as a second set of numbers of instances of the features existing in the exemplary data in the anti-corpus category.

Still yet, as a further option, a calculation may be performed for determining a probability associated with each of the features existing in the exemplary data in both the corpus category and the anti-corpus category, utilizing the first set of numbers of instances and the second set of numbers of instances. Moreover, a weighted probability may be calculated, which is associated with each of the features existing in the exemplary data in both the corpus category and the anti-corpus category.

In still yet another embodiment, the predetermined set of features may be included in a database that includes a probability associated with each of the features. This predetermined set of features may be further reduced based on the probabilities associated with the features. Specifically, the predetermined set of features may be reduced for enhancing the categorization, when utilizing a mobile computer.

In use, in accordance with still yet another embodiment, the features of the binary data may be extracted utilizing a window that is moved with respect to the binary data. Such movement may occur at increments of 1-byte. As a substitute or a supplement for such particular feature extraction technique, the features may be further extracted utilizing a dictionary.

Further, the extracted features may be used to identify a list of probabilities, utilizing the aforementioned database. Such list of probabilities may be further ordered based on an associated weight. As an option, the list of probabilities may be reduced based on the weight. As yet another option, the list of probabilities may be processed utilizing a Fisher Chi-Square computation.

In another embodiment, the aforementioned list of probabilities may be processed to generate a threshold probability. Such threshold probability may be compared to a threshold, such that the binary data may be categorized based, at least in part, on the comparison of the threshold probability and the threshold.

Another system, method and computer program product are also provided for categorizing unwanted messages utilizing a mobile computer. In use, features are extracted from messages, utilizing a mobile computer. Further, the extracted features are compared with a predetermined set of features, utilizing the mobile computer. To this end, the messages are categorized based, at least in part, on the comparison, utilizing the mobile computer. A size of the predetermined set of features may be reduced so as to be particularly suitable for use with the mobile computer.

Still another system, method and computer program product are also provided for categorizing unwanted messages utilizing a mobile computer. In use, features are extracted from messages, utilizing a mobile computer. Processing of the features then takes place involving a comparison of the extracted features with a predetermined set of features, and categorization of the messages based, at least in part, on the comparison, utilizing the mobile computer. Such processing involves, at least in part, a Fisher Chi-Square computation.

Still yet another system, method and computer program product are further provided for categorizing unwanted messages utilizing a mobile computer. Included is a back-end server for generating a predetermined set of features. A thin-client mobile computer resides in communication with the back-end server for receiving the predetermined set of features for storage thereon. In use, the mobile computer is adapted for extracting features from messages and comparing the extracted features with the predetermined set of features for categorizing the messages based, at least in part, on the comparison.

BRIEF DESCRIPTION OF THE DRAWINGS

FIGS. 5A, 5B, 5C, 6A, 6B, 6C, and 6D illustrate a couple of examples of feature extraction, in accordance with one embodiment.

DETAILED DESCRIPTION

Figure 1:
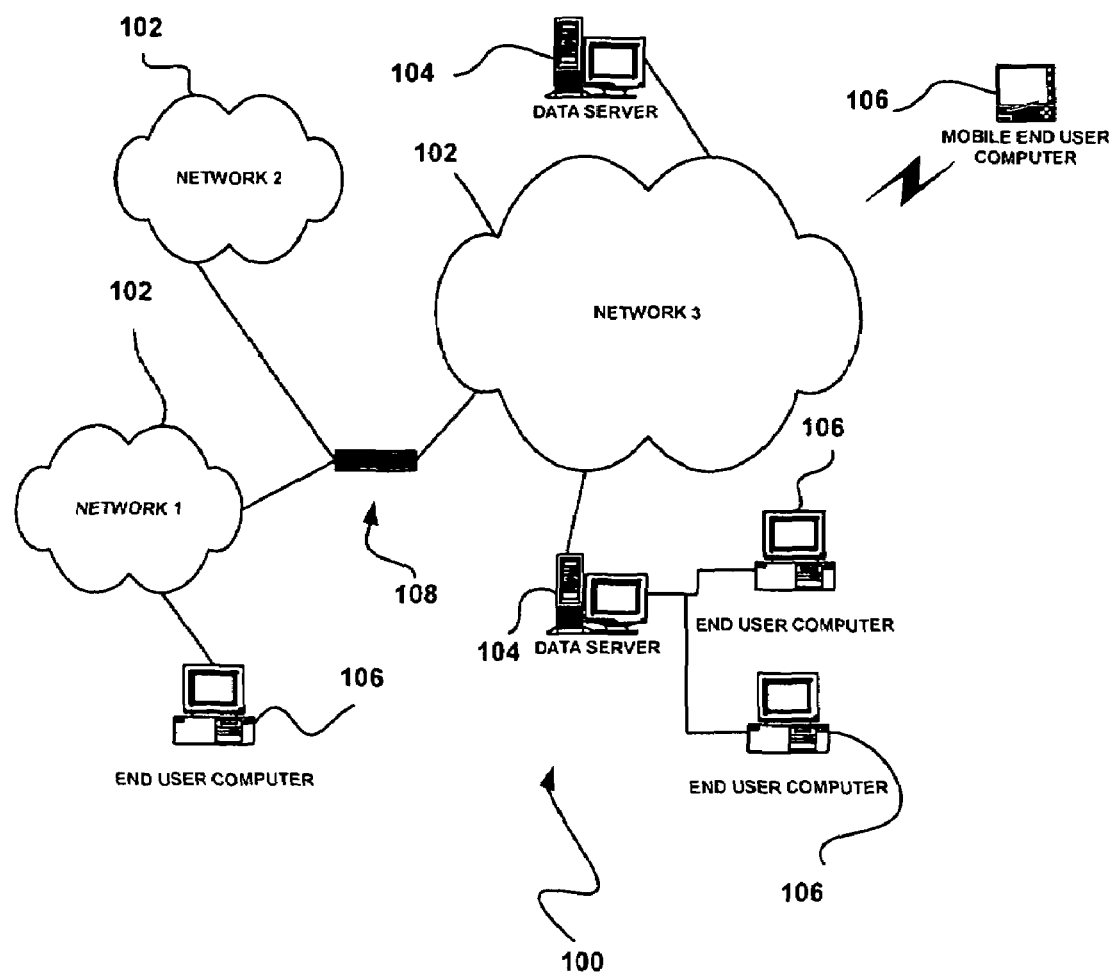
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In the context of the present description, such end user computers 106 may take the form of desktop computers, laptop computers, hand-held computers, cellular phones, personal data assistants (PDA's), and/or any other computing device. In order to facilitate communication among the networks 102, at least one gateway or router 108 is optionally coupled therebetween.

Figure 2:
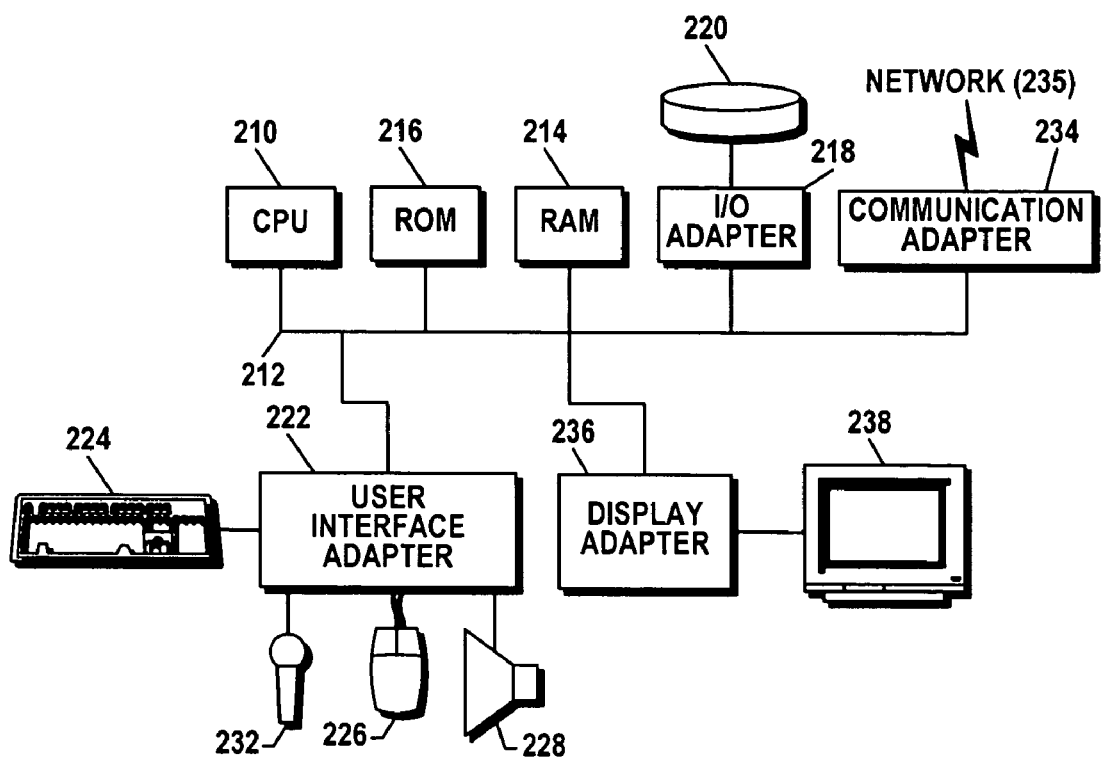
FIG. 2 shows a representative hardware environment that may be associated with the data server computers and/or end user computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3A:
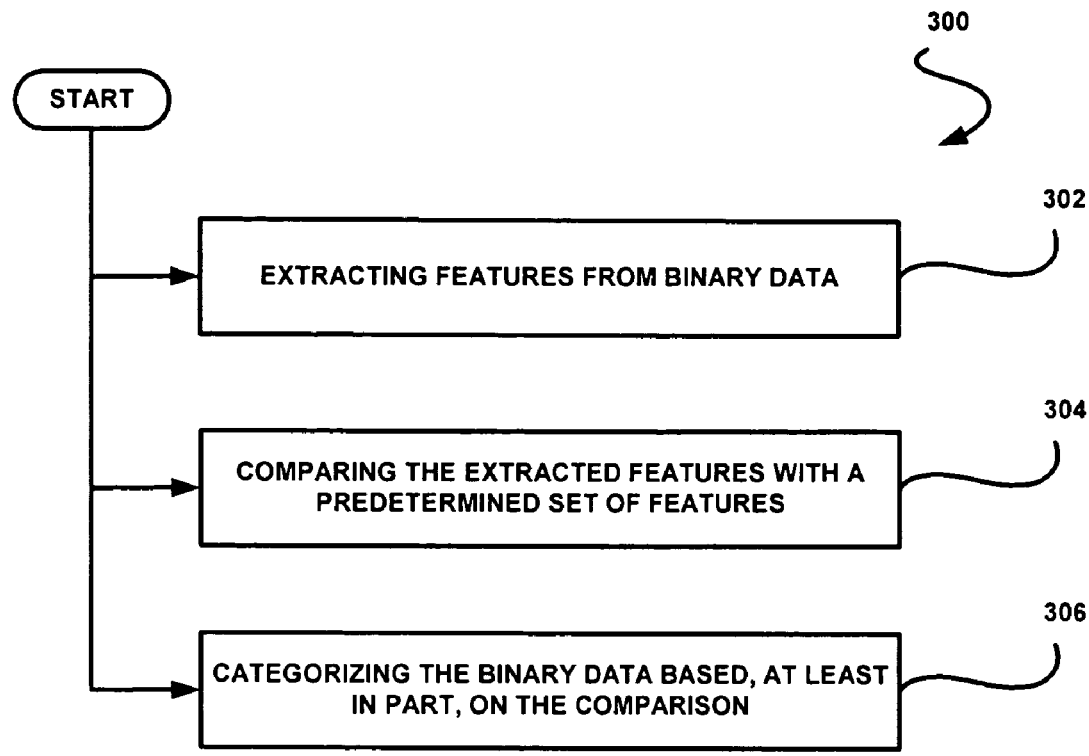
FIG. 3A illustrates a method for categorizing data, in accordance with one embodiment.

FIG. 3A illustrates a method 300 for categorizing data, in accordance with one embodiment. As an option, the present method 300 may be implemented in the context of the architecture and environment of FIGS. 1 and/or 2. Of course, however, the method 300 may be carried out in any desired environment.

As shown, features are extracted from binary data in operation 302. In the context of the present description, such features may include any pattern, aspect, characteristic, attribute, part, etc. of the binary data. Moreover, the binary data may include any data composed, at least at some level, of digital "1"'s and "0"'s.

Next, in operation 304, the extracted features are compared with a predetermined set of features. Based, at least in part, on the comparison, the binary data is categorized. Note operation 306. In one embodiment, the categorization may be utilized in the context of categorizing unwanted messages, parental controls, hypertext mark-up language documents, search results, and/or any other purpose requiring any sort of categorization.

Thus, use of binary data may provide for categorization that is language-independent and/or format-independent, etc. For example, the use of binary data may allow categorization of documents without white space, etc.

More information will now be set forth regarding one exemplary embodiment utilizing various optional features each of which may (or may not) be incorporated with the foregoing method 300 of FIG. 3, per the desires of the user.

For example, while the following example may be forth in the specific context of categorizing unwanted messages, the above method 300 of FIG. 3 (as well as the rest of the disclosed embodiments) are not limited to the same (and thus may relate to parental controls, hypertext mark-up language documents, search results, and/or any other purpose requiring any sort of categorization, etc.). Also, one may optionally borrow various features from the following description, in any desired manner. Moreover, while the following embodiment is optionally implemented, at least in part, on a mobile computer, it is emphasized that the above method 300 of FIG. 3 may be implemented on any other desired mobile and/or non-mobile platform.

Figure 3B:
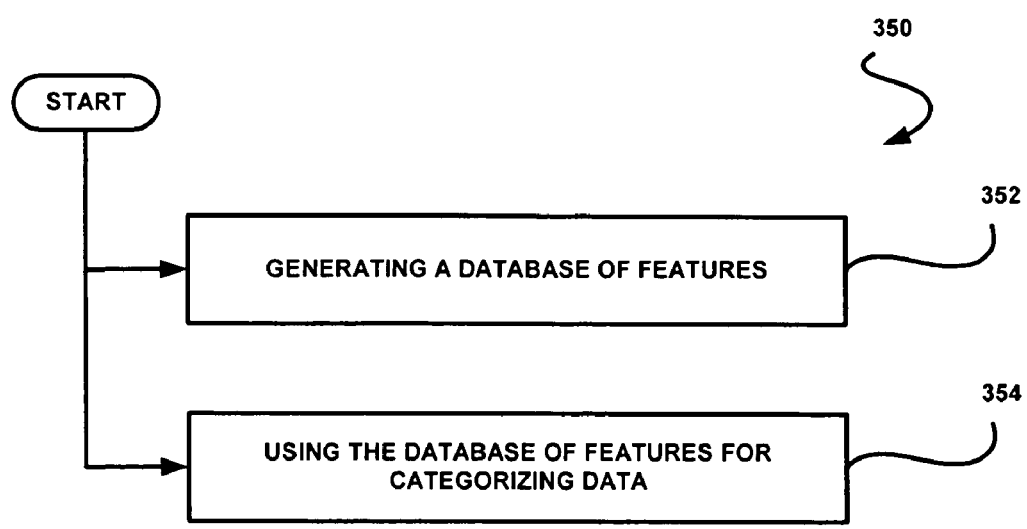
FIG. 3B illustrates a method for categorizing data, in accordance with one embodiment.

FIG. 3B illustrates a method 350 for categorizing data (e.g. messages, etc.), in accordance with one embodiment. As an option, the present method 350 may be implemented in the context of the architecture and environment of FIGS. 1 and/or 2, and/or the method 300 of FIG. 3A. Of course, however, the method 350 may be carried out in any desired environment.

As mentioned previously, while the present method 350 may be set forth in the context of categorizing unwanted messages on a mobile computer, it should be noted that the principles and features of the present embodiment may be used in any other categorization process (like those mentioned hereinabove), and may be implemented on any other desired mobile and/or non-mobile platform.

In operation 352, a database is first generated including a predetermined set of features. More information regarding operation 352 will be set forth hereinbelow in greater detail during reference to FIGS. 4-7. Next, in operation 354, the database is used for detecting/categorizing target data (e.g. unwanted messages, etc.) by a mobile computer. More information regarding operation 354 will be set forth hereinbelow in greater detail during reference to FIG. 8.

In the context of the present description, a mobile computer includes any computer that is a thin client which, in turn, may include any computer that has less resources than a server. Further, in the context of the present description, the aforementioned messages may be any sort of communication involving the mobile computer.

In one embodiment, operation 352 is carried out utilizing a server (e.g. see data server computer 104 from FIG. 1, etc.). Further, operation 354 is carried out by a mobile computer (e.g. see mobile end user computer 106 from FIG. 1, etc.). To this end, an architecture is provided including a back-end server for generating a predetermined set of features. Further, a thin-client mobile computer resides in communication with the back-end server for receiving the predetermined set of features for storage thereon. Thus, in use, the mobile computer is adapted for extracting features from target data (e.g. unwanted messages, etc.) and comparing the extracted features with the predetermined set of features for categorizing the data based, at least in part, on the comparison.

Figure 4:
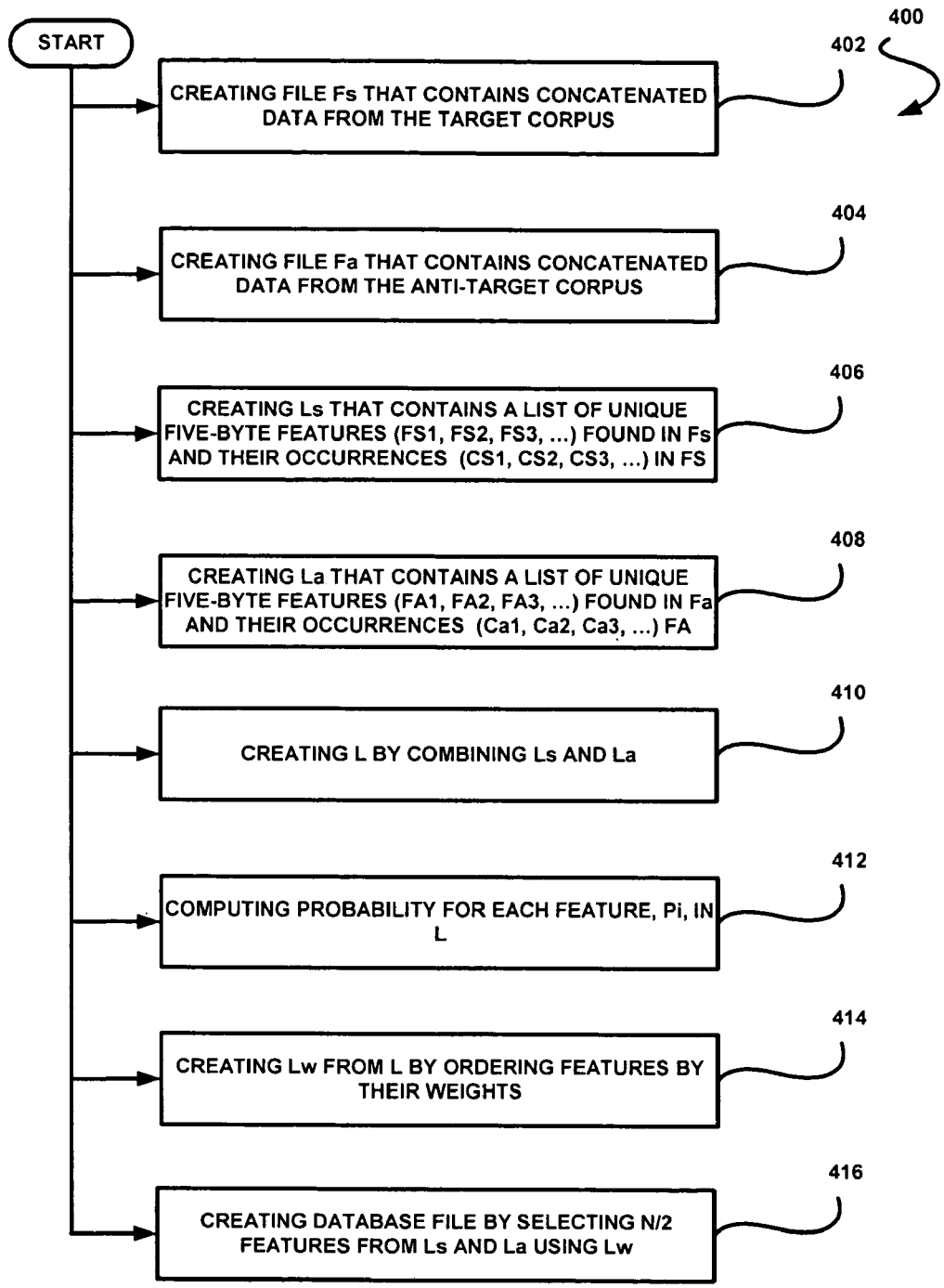
FIG. 4 illustrates a method for generating a database for use when categorizing data, in accordance with one embodiment.

FIG. 4 illustrates a method 400 for generating a database for use when categorizing data (e.g. messages, etc.), in accordance with one embodiment. As an option, the present method 400 may be implemented in the context of the architecture and environment of FIGS. 1 and/or 2, and/or in the context of operation of 352 of FIG. 3B. Of course, however, the method 400 may be carried out in any desired environment.

As shown, a first file $F_s$ is created that contains concatenated data from a target corpus (e.g. unwanted messages, etc.) in operation 402, and a second file $F_a$ is further created that contains concatenated data from an anti-target corpus (e.g. wanted messages, etc.). Note operation 404. The anti-target corpus may include a collection of data that has been verified to be 100% non-target, and is used to train against false positive matches. It may be representative of the breadth of types of data that is not to be considered target data.

Next, features are extracted from the first file and second file. Specifically, a first list $L_s$ is created that contains a predetermine set of all unique five-byte features ($fs_1$, $fs_2$, $fs_3$, ... ) found in the first file $F_s$ and their occurrences ($cs_1$, $cs_2$, $cs_3$, ... ) in the first file $F_s$. Note operation 406. Similarly, a second list $L_a$ is created that contains a predetermined set of all unique five-byte features ($fa_1$, $fa_2$, $fa_3$, ... ) found in the second file $F_a$ and their occurrences ($ca_1$, $ca_2$, $ca_3$, ... ) in the second file $F_a$.

In the present embodiment, a feature may optionally include a unique group of five consecutive bytes. Further, the feature may be selected by moving a five-byte window across the input data, one byte at a time. A feature does not necessarily represent or contain textual information. Rather, it may be just five bytes of binary data. It is, therefore, both language and character-set independent. Again, while the above feature is set forth in the context of the present embodiment, a feature may include any pattern, aspect, characteristic, attribute, part, etc. of the binary data, in the context of the present description.

A couple of examples of the aforementioned feature extraction will now be set forth during the descriptions FIGS. 5A-6D. FIG. 5A illustrates a given a sequence 500 of 1-byte alphabet characters, namely 19 unique 5-byte-long features 502. As illustrated in the FIG. 5B, "ATGGC" 504 is selected as a first feature, "TGGCA" 506 as a next feature, "GGCAA" 508 as a next feature, and so on. For reasons that will soon become apparent, any repetition of any of the features (i.e. instances of features) is counted and tracked in a database 602, as shown in FIG. 5C.

As stated before, feature selection does not distinguish binary data from text data. FIGS. 6A-6D illustrate features in an 8 character (2 bytes per character)-long Japanese text.

Figures 6C, 6D:
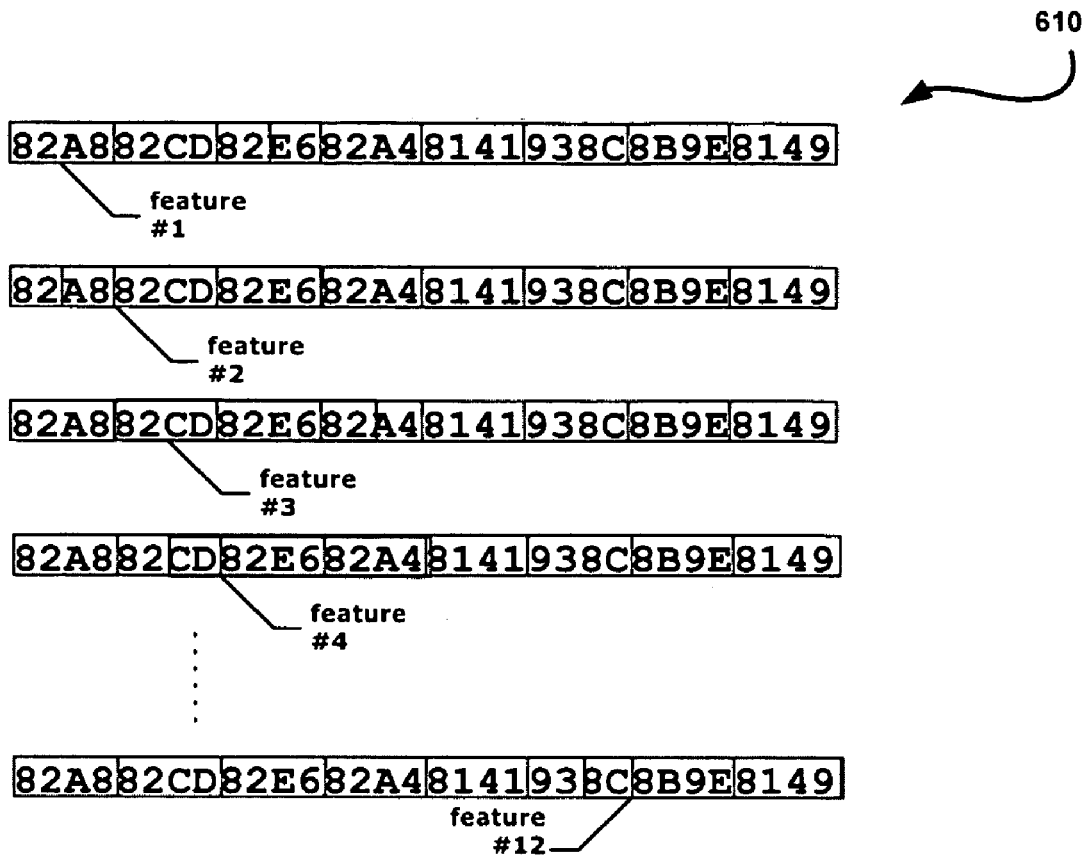

Note the text 604 in FIG. 6A. FIG. 6B shows a hexadecimal representation 606 of the Japanese text 604 in FIG. 6A. By moving a 5-byte window 610 across the 16 byte data, one byte at a time, 12 features are selected, as shown in FIG. 6C. Note a resultant database 612 in FIG. 6D. Again, for reasons that will soon become apparent, repetition of any of the features (i.e. instances of features) may be counted and tracked.

While one technique has been set forth hereinabove, it should be noted that any desired technique may be used to extract the desired features. Just by way of example, text associated with the features may be compared against a dictionary. Specifically, a dictionary-based technique may be used to optimize the feature extraction process whereby the instant method "learns" about existing data, and produces a feature database.

Using the dictionary-based feature extraction, the present technique is able to optimize the number of features in the database, by allowing the same database size, to store more features, and hence have better detection. This technique, which requires memory to store and load the dictionary, may merely be a backend server process that is used to create the feature database. On mobile devices, one may simply use the resulting database, due to resource limitation issues.

Thus, a dictionary of known words is loaded in memory (optionally using hashing for fast word lookup), after which both the target and the anti-target data sets (which are essentially files) are analyzed. Specifically, a data pointer is moved from byte offset 0 to byte offset (FILE_SIZE−1), and a lookup into the dictionary is attempted to determine if a word starting at the current offset exists in the dictionary.

The hashing that is used for storing dictionary words has a word-length clusterization. Moreover, the dictionary has the shortest word length cut to be at least 3 characters, and less than 16.

For each offset N in the currently analyzed data set "DS" (target or anti-target), the dictionary hashing is queried as set forth in Table #1.

TABLE 1 a) Does a word composed by the:
WORD = DS[N] . DS[N+1] . DS[N+2] characters exist in the dictionary?
where the '.' operator is the concatenation.
b) Does a word composed by the:
WORD = DS[N] . DS[N+1] . DS[N+2] . DS[N+3] characters exist in the dictionary?
...
) Does a word composed by the:
WORD = DS[N] . DS[N+1] . DS[N+2] . DS[N+3] . . . . . DS[N+15] characters exist in the dictionary?

Then, among these 16 questions, the longest word is found and stored, similar to the window-based algorithm. In one embodiment, instances of the word, like before, may be counted. Thereafter, assuming the longest word found at offset N has length S, the new offset is set to be (N+S), and the process is repeated until the end of the data set. If no word is found, one may simply move the offset to (N+1).

When using this technique, one might find, inside the data set, contiguous stripes of bytes that have not been matched to dictionary words. Such wasted bytes may be stored in a temporary file while processing the remaining data set. Moreover, such temporary file may be analyzed using the foregoing window-based algorithm, to produce features that have not been collected by the dictionary. This may be beneficial for improving the detection rate of the dictionary-based feature extraction.

Referencing again FIG. 4, a combined feature-probability list L is created by combining the first list $L_s$ and second list $L_a$. Note operation 410. Thereafter, in operation 412, a probability is calculated for each feature, $p_i$, in the combined feature-probability list L. Such combined feature-probability list L is created by computing each feature probability value $p_i$ using the equations in Equation Set #1 below.

$$p_{si} = \frac{s \cdot x + c_{si}}{s + n_s},$$

$$p_{ai} = \frac{s \cdot x + c_{ai}}{s + n_a},$$

$$p_i = \frac{p_{si}}{p_{si} + p_{ai}},$$

Equation Set #1 where:
$c_{s_i}$ is number of times feature $f_i$ is found in $F_s$,
$c_{a_i}$ is number of times feature $f_i$ is found in $F_a$,
$n_s$ is number of features in $F_s$,
$n_a$ is the number of features in $F_a$,
s=1,
x=0.5.

The resulting $p_i$ is a probability estimate that takes into account where $c_{si}$ and/or $c_{ai}$ is 0 or a relatively small number.

Next, a weighted probability feature list $L^w$ is created from the combined feature-probability list L in operation 414. This may be accomplished by ordering features by their weights. Finally, in operation 416, a database file is created by selecting n/2 features from the first list $L_s$ and second list $L_a$ using the weighted probability feature list $L^w$.

The weighted probability feature list $L^w$ is created by sorting the combined feature-probability list L using the following weight equation shown below as Equation #2.

$$w_i = |p_i - 0.5|$$

Equation #2

By sorting the features according to their weights, the weighted probability feature list $L^w$ is ordered by statistical significance in each category. For example, feature $f_i$ that appears 9 times in the first file $F_s$ and once in the second file $F_a$ has $p_i$=0.9 and $w_i$=0.4. Feature $f_j$ that appears once in the first file $F_s$ and 9 times in the second file $F_a$ has $p_j$=0.1 and $w_j$=0.4. When sorted by the weight, both $f_i$ and $f_j$ would be grouped together in the weighted probability feature list $L^w$.

The database file is created in operation 416 by selecting an equal number (n/2) of highest weighted features from the first list $L_s$ and the second list $L_a$.

Figure 7:
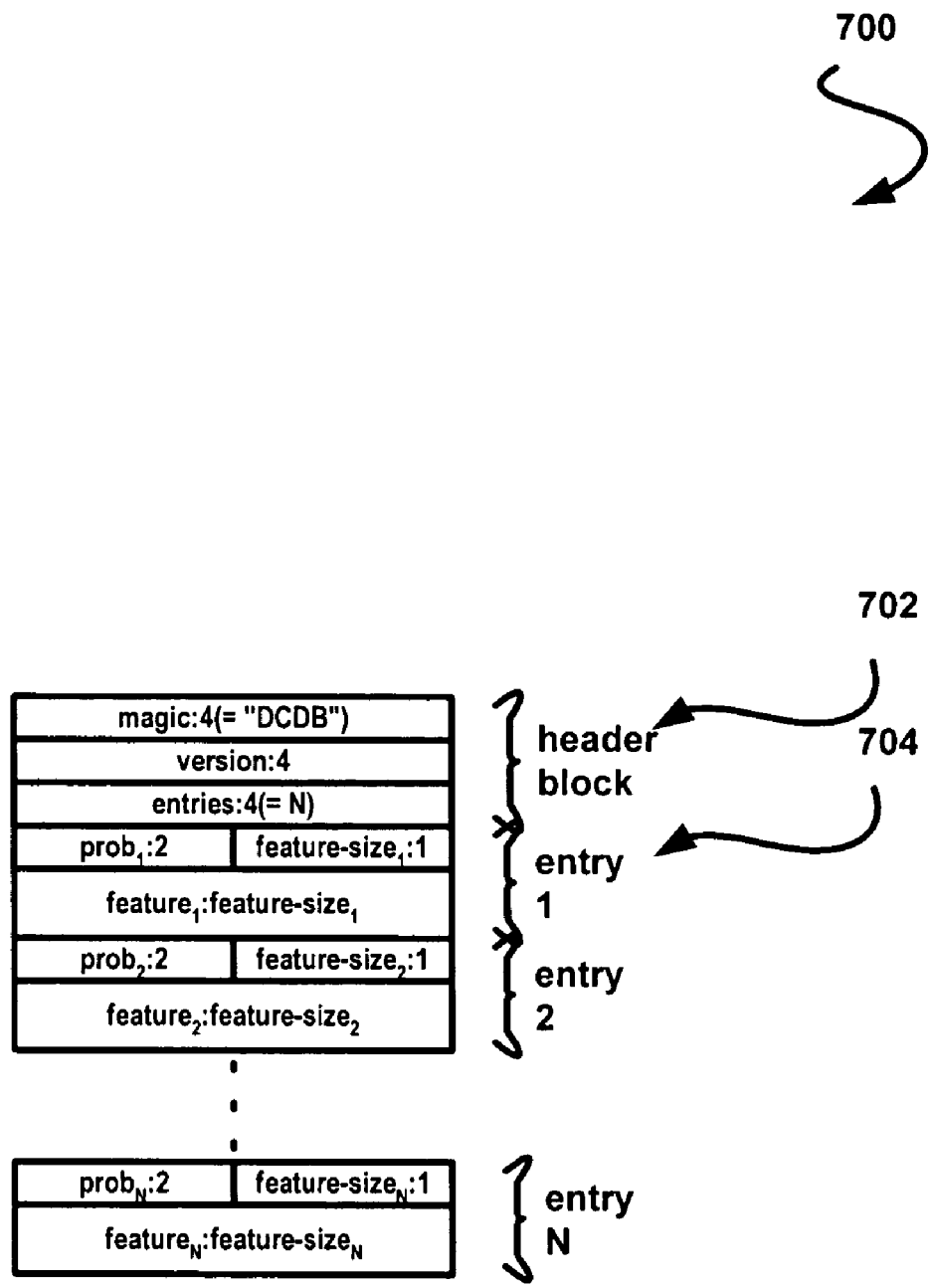
FIG. 7 illustrates an exemplary database file for storing a predetermined set of features and associated probabilities, in accordance with one embodiment.

FIG. 7 illustrates an exemplary database file 700 for storing the predetermined set of features and associated probabilities, in accordance with one embodiment. As shown, the database file 700 is organized into header information 702 and a list of feature entries 704.

For example, the header information 702 may contain a 4-byte file magic "DCDB", 4-byte database file version information, and a number of feature entries listed. Each feature entry 704 may include a 2-byte probability value, a 1-byte feature length, and the feature itself. An actual probability for each feature may be computed by normalizing the stored probability $s_i$ using Equation #3 below.

$$p_i = \frac{s_i}{65535}$$

Equation #3

Figure 8:
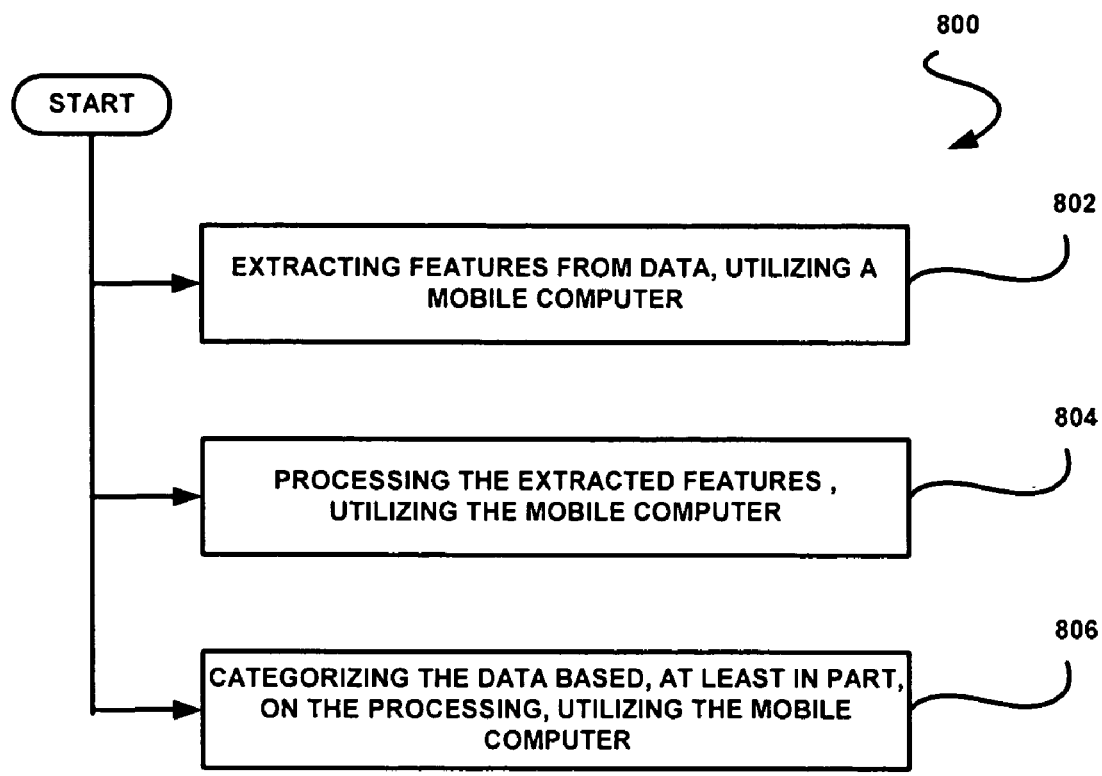
FIG. 8 illustrates a method for using a database of features for categorizing data, in accordance with one embodiment.

FIG. 8 illustrates a method 800 for using a database of features for categorizing data (e.g. messages, etc.), in accordance with one embodiment. As an option, the present method 800 may be implemented in the context of the architecture and environment of FIGS. 1 and/or 2, and/or in the context of operation of 354 of FIG. 3B. Of course, however, the method 800 may be carried out in any desired environment.

As shown, features are extracted from data (e.g. messages, etc.), utilizing a mobile computer. Note operation 802. As an option, such feature extraction may be carried out using any one of the techniques discussed hereinabove during the description of operations 406-408 from FIG. 4 (or any desired technique, for that matter).

Further, processing of such features is carried out including a comparison of the extracted features with a predetermined set of features (e.g. using the database file 700 of FIG. 7, for example), utilizing the mobile computer. Note operation 804. As mentioned previously, a size of the predetermined set of features may be reduced so as to be suitable for use with the mobile computer. For example, such predetermined set of features may be reduced such that it will not overload the memory and/or processing capabilities of the mobile computer.

In one embodiment, the space used for the database file on permanent storage (e.g. flash, SRAM, etc.) may be about 8 bytes per feature. With a database of 5,000 features, for example, the size of the database file may roughly result in about 40 kb. The space requested by a features hashing in RAM may be about 20-22 bytes per feature. Thus, the same database may require about 100-110 kb of heap memory (RAM). The example size of 5,000 features is not casual, but instead it seems to be a possible minimum size to guarantee decent detection performance.

The aforementioned processing of operation 804 involves using the comparison of the extracted features with the predetermined set of features to identify (e.g. look up, etc.) a list of probabilities using a database (e.g. the database file 700 of FIG. 7, for example). An example of the processing of operation 804 will now be set forth.

Given a piece of data, five consecutive bytes of data are sequentially taken to search the database file including the predetermined set of features. If a feature match is found, the corresponding probability value may be stored in a list. For example, if P represents the list and $p_i$ is an element in P, and given the following input: "Hello, world\n", an attempt is made to match the following patterns from the input "Hello", "ello,", "llo,", "lo, w", "o, wo", ", wor", "worl", "world", "orld\n" (note: '\n' is considered 1-byte long for this example). Further, the probability list P is constructed. Again, it should be noted that the five bytes from the data are treated as binary; therefore, there is no discrimination between text and binary data.

Such probability list P may be further ordered based on an associated weight. As an option, the list of probabilities may be reduced based on the weight. In particular, the elements in the list P may be ordered by weight, $w_i = |p_i - 0.5|$, and n elements with the highest weight values may be selected for a Fisher Chi-square computation to generate a threshold probability. In one embodiment, n may be set to be less than or equal to 31.

Following in Example #1 is an exemplary Fisher Inverse Chi-Square computation set forth for illustrative purposes.

EXAMPLE #1

Given a list P and an integer value n such that
P={$p_1, p_2, \ldots, p_n$},
where n is the length of the probability list selected.

The probability that a given piece of data is target data (e.g. unwanted messages, etc.), θ, is computed as $$\mu = \prod_{i=1}^{n} p_i$$

$$\nu = \prod_{i=1}^{n} (1 - p_i)$$

$$\omega = X^{-1}(-2 \log(\mu), 2n)$$

$$\lambda = X^{-1}(-2 \log(\nu), 2n)$$

$$\theta = \frac{(1 + \omega - \lambda)}{2}$$

The inverse chi-square function $X^{-1}(\chi, n)$ is defined as $$\chi' = \frac{\chi}{2}$$

$\alpha = \beta = \exp(-\chi')$
for $i = 1 : n/2$ $$\beta = \beta \times \frac{\chi'}{i}$$

$\alpha = \alpha + \beta$
end
if $\alpha > 1.0$ then return 1.0 else return $\alpha$ end The data is then categorized based, at least in part, on the processing, utilizing the mobile computer, as noted in operation 806. Specifically, the threshold probability may be compared to a threshold, such that the data may be categorized based, at least in part, on the comparison of the threshold probability and the threshold.

As an example (in the context of one exemplary embodiment involving the categorization of messages), the threshold probability may be compared against a threshold of (0.85), where any probabilities above such threshold are considered to indicate an unwanted message. As another example, there may be dual thresholds. For example, any probabilities less than (0.15) may indicate a wanted message, while any probabilities between the foregoing high and low thresholds indicate that it is unknown whether the message is wanted or not.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by subnational groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems. Thus, by optionally incorporating the present technology into the cyber-frameworks of the foregoing potential targets, terrorism may be countered by preventing the infection thereof with malware, which may potentially cause extreme financial harm.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for categorizing data, comprising:
   extracting features from binary data;
   comparing the extracted features with a predetermined set of features; and
   categorizing the binary data based, at least in part, on the comparison;
   wherein use of the binary data provides for language-independent and format-independent categorization;
   wherein the predetermined set of features is generated by processing exemplary data associated with a corpus category and an anti-corpus category, the corpus category including target data and the anti-corpus category including non-target data;
   wherein the processing includes extracting features from the exemplary data from both the corpus category and the anti-corpus category;
   wherein the processing includes counting a first set of numbers of instances of the features existing in the exemplary data in the corpus category, and a second set of numbers of instances of the features existing in the exemplary data in the anti-corpus category;
   wherein the processing includes calculating a probability associated with each of the features existing in the exemplary data in both the corpus category and the anti-corpus category, utilizing the first set of numbers of instances and the second set of numbers of instances;
   wherein the processing includes calculating a weighted probability associated with each of the features existing in the exemplary data in both the corpus category and the anti-corpus category.

2. The method as recited in claim 1, wherein the predetermined set of features is generated by analyzing the exemplary data in at least one of the corpus category and the anti-corpus category.

3. The method as recited in claim 1, wherein the predetermined set of features is included in a database that includes a probability associated with each of the features in the predetermined set of features.

4. The method as recited in claim 3, wherein the predetermined set of features is reduced based on the probabilities associated with the features in the predetermined set of features.

5. The method as recited in claim 4, wherein the predetermined set of features is reduced for enhancing the categorizing utilizing a mobile computer.

6. The method as recited in claim 3, wherein the extracted features are used to identify a list of probabilities, utilizing the database.

7. The method as recited in claim 6, wherein the list of probabilities is ordered based on an associated weight.

8. The method as recited in claim 7, wherein the list of probabilities is reduced based on the weight.

9. The method as recited in claim 6, wherein the list of probabilities is processed utilizing a Fisher Chi-Square computation.

10. The method as recited in claim 6, wherein the list of probabilities is processed to generate a threshold probability.

11. The method as recited in claim 10, wherein the threshold probability is compared to a threshold.

12. The method as recited in claim 11, wherein the binary data categorization is based, at least in part, on the comparison of the threshold probability and the threshold.

13. The method as recited in claim 1, wherein the features are extracted from the binary data utilizing a window that is moved with respect to the binary data.

14. The method as recited in claim 13, wherein the moving occurs at increments of 1-byte.

15. The method as recited in claim 1, wherein the features are extracted from the binary data utilizing a dictionary.

16. The method as recited in claim 1, wherein the categorization is utilized for categorizing unwanted messages.

17. The method as recited in claim 1, wherein the categorization is utilized for parental controls.

18. The method as recited in claim 1, wherein the categorization is utilized for categorizing hypertext mark-up language documents.

19. The method as recited in claim 1, wherein the use of binary data allows categorization of documents without white space.

20. The method as recited in claim 1, wherein the extracted features each includes a unique group of five consecutive bytes.

21. The method as recited in claim 1, wherein the binary data is categorized as unwanted based on a computed probability θ, where the probability θ is computed utilizing the equation:

P={$p_1, p_2, \ldots, p_n$}, where P is a list of probabilities associated with at least one feature within the predetermined set of features that matches the extracted features, and n is the number of probabilities in P;

$$\mu = \prod_{i=1}^{n} p_i$$

$$v = \prod_{i=1}^{n} (1 - p_i)$$

$$\omega = X^{-1}(-2 \log(\mu), 2n)$$

$$\lambda = X^{-1}(-2 \log(v), 2n)$$

$$\theta = \frac{(1 + \omega - \lambda)}{2}.$$

22. A computer program product embodied in memory and executed to control a processor to categorize data, comprising:
computer code extracting features from binary data;
computer code comparing the extracted features with a predetermined set of features; and
computer code categorizing the binary data based, at least in part, on the comparison;
wherein use of the binary data provides for language-independent and format-independent categorization;
wherein the predetermined set of features is generated by processing exemplary data associated with a corpus category and an anti-corpus category, the corpus category including target data and the anti-corpus category including non-target data;
wherein the processing includes extracting features from the exemplary data from both the corpus category and the anti-corpus category;
wherein the processing includes counting a first set of numbers of instances of the features existing in the exemplary data in the corpus category, and a second set of numbers of instances of the features existing in the exemplary data in the anti-corpus category;
wherein the processing includes calculating a probability associated with each of the features existing in the exemplary data in both the corpus category and the anti-corpus category, utilizing the first set of numbers of instances and the second set of numbers of instances;
wherein the processing includes calculating a weighted probability associated with each of the features existing in the exemplary data in both the corpus category and the anti-corpus category.

23. A system to categorize data, comprising:
processor;
memory in communication with the processor;
means for extracting features from binary data;
means for comparing the extracted features with a predetermined set of features; and
means for categorizing the binary data based, at least in part, on the comparison;
wherein use of the binary data provides for language-independent and format-independent categorization;
wherein the predetermined set of features is generated by processing exemplary data associated with a corpus category and an anti-corpus category, the corpus category including target data and the anti-corpus category including non-target data;
wherein the processing includes extracting features from the exemplary data from both the corpus category and the anti-corpus category;
wherein the processing includes counting a first set of numbers of instances of the features existing in the exemplary data in the corpus category, and a second set of numbers of instances of the features existing in the exemplary data in the anti-corpus category;
wherein the processing includes calculating a probability associated with each of the features existing in the exemplary data in both the corpus category and the anti-corpus category, utilizing the first set of numbers of instances and the second set of numbers of instances;
wherein the processing includes calculating a weighted probability associated with each of the features existing in the exemplary data in both the corpus category and the anti-corpus category.

24. A method for categorizing unwanted messages utilizing a mobile computer, comprising:
extracting features from messages, utilizing a mobile computer;
comparing the extracted features with a predetermined set of features, utilizing the mobile computer; and
categorizing the messages based, at least in part, on the comparison, utilizing the mobile computer;
wherein a size of the predetermined set of features is reduced and used with the mobile computer;
wherein the predetermined set of features is generated by processing exemplary data associated with a corpus category and an anti-corpus category, the corpus category including target data and the anti-corpus category including non-target data;
wherein the processing includes extracting features from the exemplary data from both the corpus category and the anti-corpus category;
wherein the processing includes counting a first set of numbers of instances of the features existing in the exemplary data in the corpus category, and a second set of numbers of instances of the features existing in the exemplary data in the anti-corpus category;
wherein the processing includes calculating a probability associated with each of the features existing in the exemplary data in both the corpus category and the anti-corpus category, utilizing the first set of numbers of instances and the second set of numbers of instances;

wherein the processing includes calculating a weighted probability associated with each of the features existing in the exemplary data in both the corpus category and the anti-corpus category.

25. A method for categorizing unwanted messages utilizing a mobile computer, comprising:

extracting features from messages, utilizing a mobile computer;

processing the features by: comparing the extracted features with a predetermined set of features, and categorizing the messages based, at least in part, on the comparison, utilizing the mobile computer;

wherein the processing involves, at least in part, a Fisher Chi-Square computation;

wherein a size of the predetermined set of features is reduced and used with the mobile computer;

wherein the predetermined set of features is generated by processing exemplary data associated with a corpus category and an anti-corpus category, the corpus category including target data and the anti-corpus category including non-target data;

wherein the processing includes extracting features from the exemplary data from both the corpus category and the anti-corpus category;

wherein the processing includes counting a first set of numbers of instances of the features existing in the exemplary data in the corpus category, and a second set of numbers of instances of the features existing in the exemplary data in the anti-corpus category;

wherein the processing includes calculating a probability associated with each of the features existing in the exemplary data in both the corpus category and the anti-corpus category, utilizing the first set of numbers of instances and the second set of numbers of instances;

wherein the processing includes calculating a weighted probability associated with each of the features existing in the exemplary data in both the corpus category and the anti-corpus category.

26. A system for categorizing unwanted messages utilizing a mobile computer, comprising:

a back-end server generating a predetermined set of features;

a thin-client mobile computer in communication with the back-end server, the thin-client mobile computer receiving the predetermined set of features for storage thereon, extracting features from messages, and comparing the extracted features with the predetermined set of features for categorizing the messages based, at least in part, on the comparison;

wherein a size of the predetermined set of features is reduced and used with the mobile computer;

wherein the predetermined set of features is generated by processing exemplary data associated with a corpus category and an anti-corpus category, the corpus category including target data and the anti-corpus category including non-target data;

wherein the processing includes extracting features from the exemplary data from both the corpus category and the anti-corpus category;

wherein the processing includes counting a first set of numbers of instances of the features existing in the exemplary data in the corpus category, and a second set of numbers of instances of the features existing in the exemplary data in the anti-corpus category wherein the processing includes calculating a probability associated with each of the features existing in the exemplary data in both the corpus category and the anti-corpus category, utilizing the first set of numbers of instances and the second set of numbers of instances;

wherein the processing includes calculating a weighted probability associated with each of the features existing in the exemplary data in both the corpus category and the anti-corpus category.

* * * * *